(12) United States Patent
Yoshitomi et al.

(10) Patent No.: US 11,296,345 B2
(45) Date of Patent: Apr. 5, 2022

(54) AIR CLEANER

(71) Applicant: HONDA MOTOR CO., LTD., Tokyo (JP)

(72) Inventors: Ryoichi Yoshitomi, Wako (JP); Kenta Okawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 141 days.

(21) Appl. No.: 16/910,705

(22) Filed: Jun. 24, 2020

(65) Prior Publication Data

US 2020/0411890 A1 Dec. 31, 2020

(30) Foreign Application Priority Data

Jun. 26, 2019 (JP) .............................. JP2019-118183

(51) Int. Cl.
*H01M 8/0662* (2016.01)
*H01M 8/04119* (2016.01)

(52) U.S. Cl.
CPC ..... *H01M 8/0687* (2013.01); *H01M 8/04134* (2013.01); *H01M 2250/20* (2013.01)

(58) Field of Classification Search
CPC ........... H01M 8/0687; H01M 8/04134; H01M 2250/20; H01M 8/04201; H01M 8/04231; B60L 50/72
See application file for complete search history.

(56) References Cited

U.S. PATENT DOCUMENTS

| | | | |
|---|---|---|---|
| 2003/0108784 A1 | 6/2003 | Enjoji et al. | |
| 2009/0017745 A1* | 1/2009 | Kum | H01M 8/04089 454/156 |
| 2012/0021301 A1* | 1/2012 | Ohashi | B62D 25/2072 429/400 |
| 2016/0207419 A1* | 7/2016 | Ohashi | B60L 50/71 |
| 2017/0096172 A1 | 4/2017 | Nagaosa | |

FOREIGN PATENT DOCUMENTS

| | | |
|---|---|---|
| JP | 2003-173790 A | 6/2003 |
| JP | 2004-168259 A | 6/2004 |
| JP | 2006-107942 A | 4/2006 |
| JP | 2006216256 A | 8/2006 |
| JP | 2009-021215 A | 1/2009 |
| JP | 2015-157608 A | 9/2015 |
| JP | 2015-231319 A | 12/2015 |

OTHER PUBLICATIONS

Office Action dated Mar. 30, 2021 issued over the corresponding Japanese Patent Application No. 2019-118183 with the English translation thereof.

* cited by examiner

*Primary Examiner* — Stewart A Fraser
(74) *Attorney, Agent, or Firm* — Carrier Blackman & Associates, P.C.; Joseph P. Carrier; William D. Blackman (57) ABSTRACT

An air cleaner is provided in a cathode system device of a fuel cell system that is mounted in a fuel cell vehicle. The air cleaner comprises a casing having an internal space through which air flows, and an air filter accommodated in the internal space. The air filter has a flat plate shape, and is arranged on an outer side of a fuel cell stack in a horizontal direction, and in a state of being inclined with respect to the horizontal direction.

8 Claims, 5 Drawing Sheets

AIR CLEANER

CROSS-REFERENCE TO RELATED APPLICATION

This application is based upon and claims the benefit of priority from Japanese Patent Application No. 2019-118183 filed on Jun. 26, 2019, the contents of which are incorporated herein by reference.

BACKGROUND OF THE INVENTION

Field of the Invention

The present invention relates to an air cleaner provided in a cathode system device of a fuel cell system that is mounted in a fuel cell vehicle.

Description of the Related Art

A fuel cell system provided in a fuel cell vehicle takes in air (outside air) from an outer part of a vehicle by a cathode system device, in order to supply to a fuel cell stack a cathode gas that is used for generating electrical power. Since foreign matter such as dust, dirt, water or the like is included in the air that is taken in, the cathode system device includes an air cleaner for removing such foreign matter on an upstream side of a cathode supply pipe.

For example, in Japanese Laid-Open Patent Publication No. 2006-216256, an air cleaner for a fuel cell is disclosed in which a filter is accommodated inside a casing. In such an air cleaner, the filter is arranged in parallel (horizontal) with respect to the vehicle body, and the foreign matter is removed by causing the air to flow from a dust side on a lower side of the filter to a clean side on an upper side of the filter.

SUMMARY OF THE INVENTION

Incidentally, a filter that is disposed horizontally inside the casing of an air cleaner acts so as to be pushed out with respect to the casing when the fuel cell vehicle receives a load from the side (in a horizontal direction), such as during a collision or the like. For this reason, the entirety of the air cleaner including the casing may undergo movement and cause damage to peripheral structures (other devices of the vehicle, other devices of the fuel cell system, etc.) of the air cleaner.

The present invention relates to the above-described air cleaner technology, and has the object of providing an air cleaner which is capable of easily reducing damage to peripheral structures by easily promoting collapsing of a casing when a load is received.

In order to achieve the aforementioned object, one aspect of the present invention is characterized by an air cleaner provided in a cathode system device of a fuel cell system configured to be mounted in a fuel cell vehicle, the air cleaner including a casing having an internal space through which air flows, and an air filter accommodated in the internal space, wherein the air filter has a flat plate shape, and is arranged on an outer side of a fuel cell stack in a horizontal direction, and in a state of being inclined with respect to the horizontal direction.

The above-described air cleaner is capable of easily promoting collapsing of the casing when a load is received by the casing. More specifically, the air filter, which is arranged in a state of being inclined with respect to the horizontal direction, positively rotates without being pushed out inside the casing when such a load is received. Accordingly, the casing of the air cleaner is smoothly collapsed by the load, movement of the air cleaner itself is suppressed, and damage caused to peripheral structures around the periphery of the casing can be significantly reduced.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

Preferred embodiments of the present invention will be presented and described in detail below with reference to the accompanying drawings.

Figure 1:
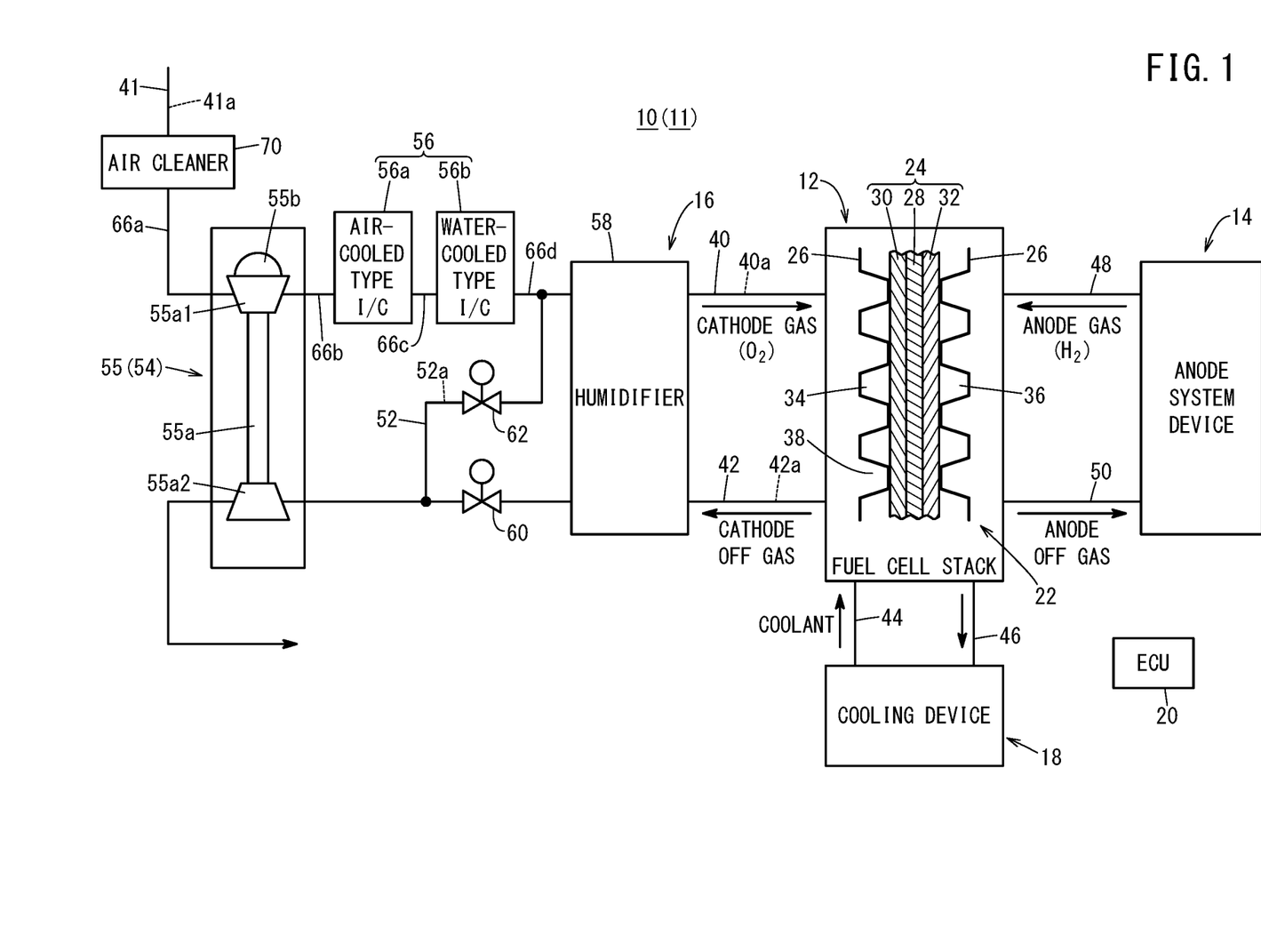
FIG. 1 is an explanatory diagram of a fuel cell system to which an air cleaner according to an embodiment of the present invention is applied.

An air cleaner 70 according to an embodiment of the present invention is applied to a fuel cell system 10 that is mounted in a fuel cell vehicle 11 (fuel cell vehicle: hereinafter, simply referred to as a vehicle 11). As shown in FIG. 1, the fuel cell system 10 includes a fuel cell stack 12, an anode system device 14, a cathode system device 16, a cooling device 18, and a control device 20 (ECU).

The fuel cell stack 12 includes a plurality of power generation cells 22, each of which generates electrical power by an electrochemical reaction between an anode gas (a fuel gas such as hydrogen or the like) that is supplied from the anode system device 14, and a cathode gas (an oxygen-containing gas such as air or the like) that is supplied from the cathode system device 16. The plurality of power generation cells 22 are stacked along a vehicle widthwise direction of the vehicle 11 with electrode surfaces thereof being stacked in an upright posture. It should be noted that the plurality of power generation cells 22 may also be stacked in a longitudinal (front-rear) direction of the vehicle 11 or in the direction of gravity.

Each of the power generation cells 22 includes a membrane electrode assembly 24 (hereinafter, referred to as an "MEA 24"), and two separators 26 that sandwich the MEA 24 therebetween. The MEA 24 includes, for example, an electrolyte membrane 28 (for example, a solid polymer electrolyte membrane (cation exchange membrane)), an anode 30 provided on one surface of the electrolyte membrane 28, and a cathode 32 provided on another surface of the electrolyte membrane 28. One from among the two separators 26 forms an anode flow field 34 through which the anode gas is allowed to flow on a surface facing toward the anode 30. The other from among the two separators 26 forms a cathode flow field 36 through which the cathode gas is allowed to flow on a surface facing toward the cathode 32. Further, surfaces where the two separators 26 face toward each other form a coolant flow field 38 through which a coolant is allowed to flow.

Further, the fuel cell stack 12 is equipped with a plurality of supply passages (not shown) which allow the anode gas, the cathode gas, and the coolant to flow along the stacking direction of the power generation cells 22, as well as to flow through the anode flow field 34, the cathode flow field 36, and the coolant flow field 38. The respective supply passages communicate with pipes of the anode system device 14, the cathode system device 16, and the cooling device 18 that are connected to the fuel cell stack 12.

As such pipes, the anode system device 14 includes an anode supply pipe 48 for supplying the anode gas to the fuel cell stack 12, and an anode discharge pipe 50 for discharging an anode off gas used for generating electrical power in the fuel cell stack 12. As such pipes, the cooling device 18 includes a coolant supply pipe 44 for supplying the coolant to the fuel cell stack 12, and a coolant discharge pipe 46 for discharging the coolant from the fuel cell stack 12.

On the other hand, as such pipes, the cathode system device 16 includes a cathode supply pipe 40 for supplying the cathode gas to the fuel cell stack 12, and a cathode discharge pipe 42 for discharging a cathode off gas used for generating electrical power in the fuel cell stack 12. Further, a bypass pipe 52 is connected between the cathode supply pipe 40 and the cathode discharge pipe 42.

The cathode system device 16, which serves as a device for supplying the cathode gas to the fuel cell stack 12, is equipped with the air cleaner 70, an air pump 54, an intercooler 56, and a humidifier 58, provided in this order from an upstream side to a downstream side of the cathode supply pipe 40.

The air cleaner 70 of the cathode system device 16 removes foreign matter (dust, dirt, water or the like) contained in the cathode gas (air) when it is drawn in from the outside air. An intake pipe 41 that constitutes part of the cathode supply pipe 40 is connected to the air cleaner 70 on a more upstream side than the air cleaner 70. The air cleaner 70 removes foreign matter in the air that has flowed in from a flow passage 41a inside the intake pipe 41, and clean air flows out to the air pump 54 on a downstream side of the air cleaner 70. The specific structure of the air cleaner 70 will be described in detail later.

For the air pump 54, for example, an expander unit 55 including a compressor and an expander is applied thereto. The expander unit 55 includes fins (a first fin 55a1 and a second fin 55a2) at both ends of a rotor 55a that is accommodated in the interior thereof. A compressor space on which the first fin 55a1 is arranged communicates with a flow passage 40a of the cathode supply pipe 40. An expander space on which the second fin 55a2 is arranged communicates with a flow passage 42a of the cathode discharge pipe 42.

The rotor 55a of the expander unit 55 is rotated by a motor mechanism 55b which is controlled by the control device 20. By way of the first fin 55a1, the expander unit 55 supplies the cathode gas to the fuel cell stack 12 through the cathode supply pipe 40, and by way of the second fin 55a2, recovers energy of the cathode off gas from the fuel cell stack 12 via the cathode discharge pipe 42. Moreover, the configuration of the air pump 54 is not particularly limited, and a compressor may be installed in the cathode supply pipe 40, without providing an expander in the cathode discharge pipe 42.

The intercooler 56 cools the cathode gas that flows in from the upstream side (the side of the expander unit 55) of the cathode supply pipe 40, and causes the cathode gas to flow out on the downstream side (the side of the humidifier 58). As the intercooler 56, both an air-cooled type intercooler 56a (air-cooled type I/C) and a water-cooled type intercooler 56b (water-cooled type I/C) are installed in the cathode supply pipe 40. Moreover, the cathode system device 16 may have a configuration in which only one of the air-cooled type intercooler 56a and the water-cooled type intercooler 56b is applied thereto.

The humidifier 58 humidifies the cathode gas of the cathode supply pipe 40 using the cathode off gas from the cathode discharge pipe 42. More specifically, water (generated water) generated due to the electrical power generation of the fuel cell stack 12 is contained in the cathode off gas, and the humidifier 58 causes an appropriate amount of moisture due to such water to be retained in the cathode gas, and supplies the moisture containing cathode gas to the fuel cell stack 12.

A back pressure valve 60, which adjusts the pressure of the cathode gas supplied to the fuel cell stack 12, is provided in the cathode discharge pipe 42. The back pressure valve 60 is configured, for example, as a butterfly valve, and a degree of opening thereof is controlled on the basis of the required generated current, or a pressure value or a flow rate value detected by a pressure sensor or a flow rate sensor (neither of which is shown). Moreover, a gas-liquid separator (not shown) for separating out the water contained in the cathode off gas may be provided in the cathode discharge pipe 42 between the humidifier 58 and the expander unit 55 (the air pump 54).

Further, a bypass valve 62 that opens and closes a flow passage 52a of the bypass pipe 52 is provided in the bypass pipe 52. By being appropriately opened and closed under the control of the control device 20, the bypass valve 62 allows the cathode gas of the cathode supply pipe 40 to flow into the cathode discharge pipe 42, and discharges the cathode gas through the cathode discharge pipe 42.

Next, with reference to FIGS. 2A and 2B, a description will be given concerning a state in which the above-described devices of the fuel cell stack 12 and the cathode system device 16 are actually installed in the vehicle 11. A stack case 12a of the fuel cell stack 12 is formed in a rectangular shape extending along the vehicle widthwise direction (the direction of the arrow A: horizontal direction) as viewed from the front, and has a predetermined thickness in the longitudinal or front-rear direction (the direction of the arrow B: horizontal direction) of the vehicle 11 and the vehicle heightwise direction (the direction of the arrow C: vertical direction) as viewed from the side. The plurality of power generation cells 22 in the interior of the stack case 12a are stacked along the direction of the arrow A in the manner described above.

At one end (on the side of the arrow A2) of the fuel cell stack 12 (the stack case 12a) in the direction of the arrow A, an auxiliary equipment case 64 is installed, in which several devices of the anode system device 14 and the cathode system device 16 are accommodated. In line with this fact, the respective devices of the cathode system device 16 are also arranged on the side of the arrow A2 of the fuel cell stack 12.

More specifically, the air cleaner 70 is arranged substantially on the front side of the auxiliary equipment case 64 (the side of the arrow B1), and on the outer side of the auxiliary equipment case 64 (the side of the arrow A2) in the widthwise direction. Further, the air cleaner 70 is arranged at substantially the same height as the fuel cell stack 12, and in particular, on the outer side of the fuel cell stack 12 in the horizontal direction (the direction parallel to the vehicle body). The air cleaner 70 is fixed to a vehicle body frame or a mounting frame for the fuel cell (neither of which are shown).

An opening 41b of the intake pipe 41 on the upstream side of the air cleaner 70 is disposed at a substantially central portion in the vehicle widthwise direction and at an appropriate height position. The intake pipe 41 extends initially from the opening 41b to an outer side (the side of the arrow A2) in the vehicle widthwise direction, and to the rear side (the side of the arrow B2), and thereafter, extends obliquely toward a downward side (the side of the arrow C2) on the front surface of the air cleaner 70.

Further, the air pump 54 is arranged downwardly of the air cleaner 70. Stated otherwise, the air pump 54 is located at a position lower than the fuel cell stack 12 (the auxiliary equipment case 64) on the side of the arrow A2 and on the side of the arrow B1 of the fuel cell stack 12. Between the air cleaner 70 and the air pump 54, a relay pipe 66a constituting part of the cathode supply pipe 40 extends in the direction of the arrow C in front of the air cleaner 70 (on the side of the arrow B1).

The air-cooled type intercooler 56a is arranged at the same height position as the air pump 54, and on the outer side of the air pump 54 (the side of the arrow A2) in the vehicle widthwise direction. Therefore, a relay pipe 66b, which constitutes part of the cathode supply pipe 40 between the air pump 54 and the air-cooled type intercooler 56a, extends in the direction of the arrow A.

Further, the water-cooled type intercooler 56b is positioned at substantially the same height as the air-cooled type intercooler 56a, and is positioned on an inner side (the side of the arrow A1) and rearwardly (on the side of the arrow B2) in the vehicle widthwise direction with respect to the air-cooled type intercooler 56a. A relay pipe 66c, which constitutes part of the cathode supply pipe 40 between the air-cooled type intercooler 56a and the water-cooled type intercooler 56b, extends in the direction of the arrow A and in the direction of the arrow B through the lower side of the air pump 54.

On the other hand, the humidifier 58 is arranged in the auxiliary equipment case 64. More specifically, the humidifier 58 is positioned at substantially the same height as the fuel cell stack 12 on the side of the arrow A2 of the fuel cell stack 12. Between the water-cooled type intercooler 56b and the humidifier 58, a relay pipe 66d that constitutes part of the cathode supply pipe 40 extends in the direction of the arrow C. Moreover, another relay pipe (not shown), which constitutes part of the cathode supply pipe 40 between the humidifier 58 and the fuel cell stack 12, extends to the side of the arrow A1 while avoiding the respective devices of the auxiliary equipment case 64, and is connected to an end plate (not shown) of the fuel cell stack 12.

Next, a description will be given concerning the configuration of the air cleaner 70 according to the present embodiment. The air cleaner 70 comprises a casing 72 having an internal space 72a through which the cathode gas (air) flows, and an air filter 80 that is accommodated in the internal space 72a.

Figure 2A:
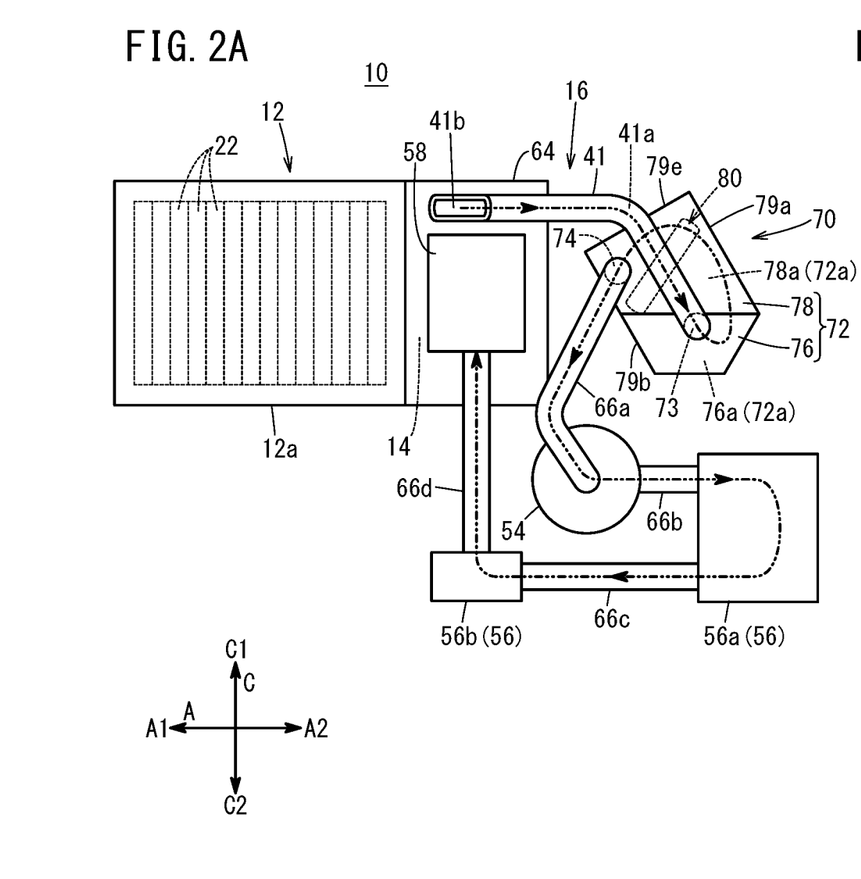
FIG. 2A is a front view schematically showing respective devices of a cathode system device that is mounted in a vehicle.
Figure 2B:
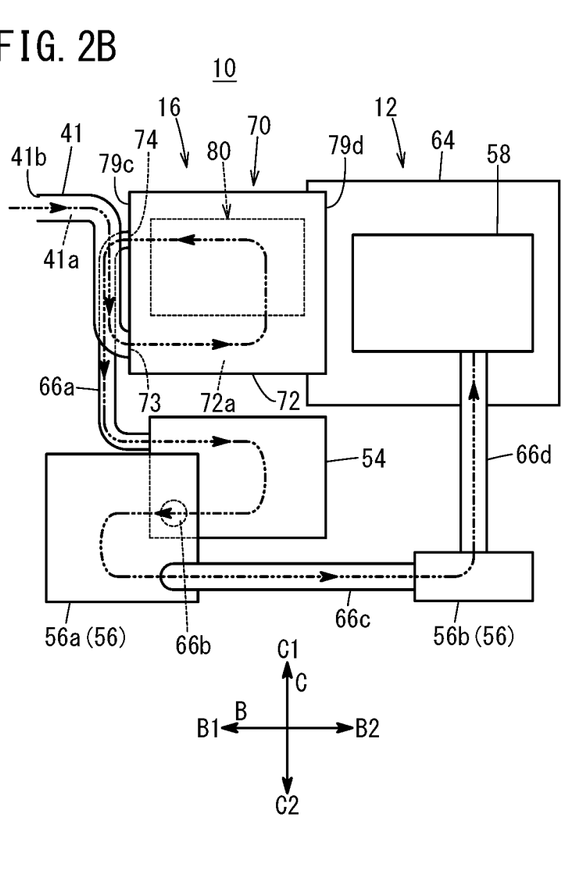
FIG. 2B is a side view schematically showing the respective devices of the cathode system device that is mounted in the vehicle.

The casing 72 for the air cleaner 70 has a polygonal shape (pentagonal shape) that is extended in the vehicle heightwise direction as viewed from the front in FIG. 2A, and has a quadrangular shape as viewed from the side in FIG. 2B. The intake pipe 41 is connected to the lower side (the side of the arrow C2) and the front side (the side of the arrow B1) of the casing 72. An air introduction port 73 through which air is introduced into the internal space 72a is provided on the casing 72 (a lower case 76) that is connected to the intake pipe 41. On the other hand, the relay pipe 66a is connected to the upper side (the side of the arrow C1) and the front side (the side of the arrow B1) of the casing 72. An air lead-out port 74 through which air is led out from the internal space 72a is provided on the casing 72 (an upper case 78) that is connected to the relay pipe 66a.

Further, the casing 72 includes the lower case 76, and the upper case 78 joined to an upper side of the lower case 76. More specifically, the internal space 72a of the casing 72 is constituted by placing in communication a lower space 76a of the lower case 76 and an upper space 78a of the upper case 78. The lower space 76a and the upper space 78a are partially partitioned by a non-illustrated partition wall, and a part of the partition wall (a non-formed part of the partition wall) enables communication therebetween. Moreover, the partition wall need not necessarily be provided between the lower space 76a and the upper space 78a.

The lower case 76 is a portion into which air from the intake pipe 41 is introduced via the air introduction port 73. The lower case 76 guides the air introduced from the intake pipe 41 so as to flow backward (to the side of the arrow B2), and thereafter, so as to be guided upward (to the side of the arrow C1). Further, the lower case 76 is capable of storing foreign matter (primarily water) contained in the outside air. A water drainage mechanism (not shown) for draining the stored water is preferably provided on a bottom wall of the lower case 76.

The upper case 78 is a portion in which the air filter 80 is accommodated, and according to the present embodiment, is connected to an upper end of the lower case 76 while being inclined toward the inner side (toward the side of the arrow A1) in the vehicle widthwise direction. More specifically, a pair of side walls 79a and 79b in the vehicle widthwise direction (the direction of the arrow A) that constitute the upper case 78 are inclined upward and parallel to the side of the arrow A1 (see also FIG. 3B). Further, a ceiling wall 79e of the upper case 78 is connected so as to be perpendicular to the pair of side walls 79a and 79b, and is inclined in a state so that the side of the arrow A1 is lower and the side of the arrow A2 is higher. Moreover, side walls 79c and 79d in the front-rear direction (the direction of the arrow B) that constitute the upper case 78 extend along the vehicle heightwise direction.

The casing 72 (the lower case 76 and the upper case 78) described above is configured so that the rigidity thereof is lower (more easily plastically deformed) than the rigidity of peripheral structures 92 (see FIG. 3B) disposed around the periphery of the casing 72.

On the other hand, the air filter 80 is accommodated in the upper space 78a of the upper case 78, thereby partitioning the upper space 78a into upper and lower parts. Stated otherwise, the upper space 78a has a dust side 78a1 on a lower side of the air filter 80, while having a clean side 78a2 on an upper side of the air filter 80 (see FIG. 3B). The air lead-out port 74 is in communication with the clean side 78a2.

Figure 3A:
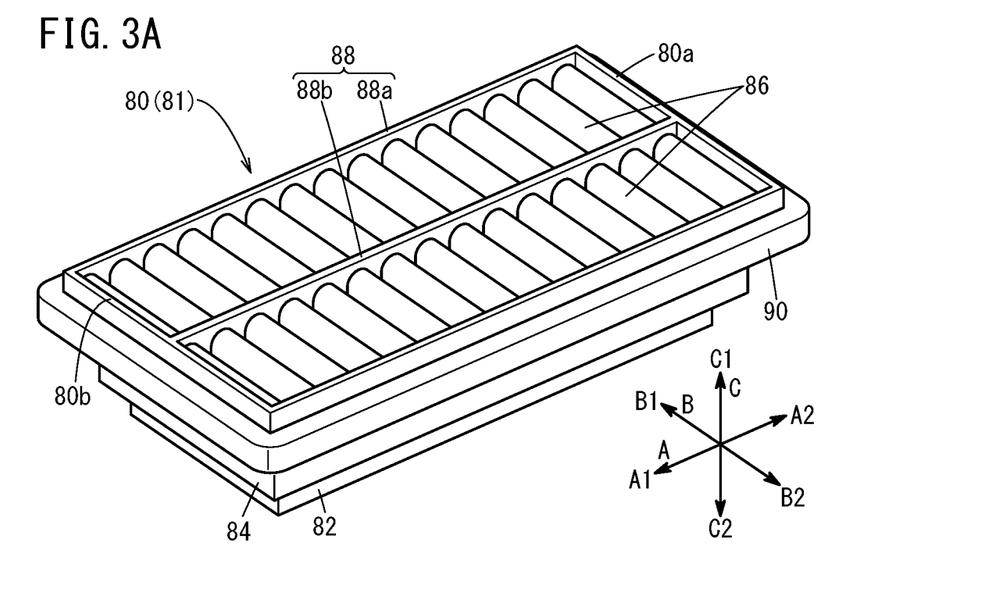
FIG. 3A is a perspective view of an air filter.
Figure 3B:
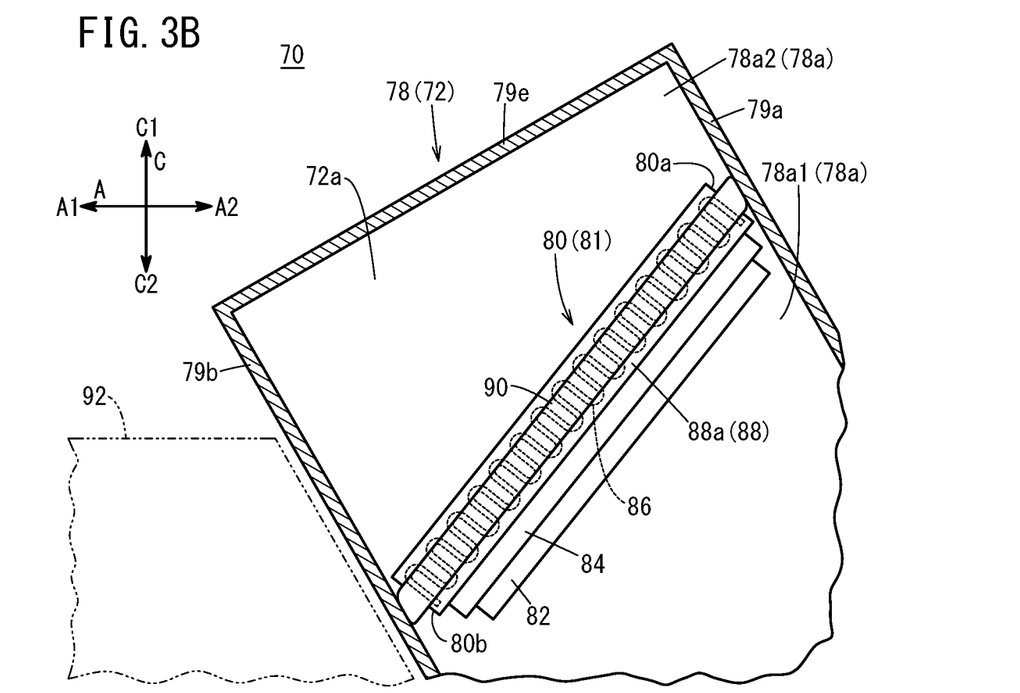
FIG. 3B is a partial side cross-sectional view showing a state in which the air filter is accommodated in a casing.

As shown in FIGS. 3A and 3B, the air filter 80 is formed in a flat plate shape. Further, the air filter 80 according to the present embodiment is of a three-layer structure 81 in which three types (a plurality of types) of filters (a pre-filter 82, a chemical filter 84, and main filters 86) are laminated in the thickness direction. It should be noted that the structure of the air filter 80 is not particularly limited, and for example, may be constituted by a single type of filter.

The pre-filter 82 faces toward the dust side 78a1, and forms a portion of the air filter 80 through which air initially passes. The pre-filter 82 is retained in the upper space 78a by being joined to one surface of the chemical filter 84. As the pre-filter 82, for example, a non-woven fabric having a predetermined thickness is applied thereto.

The chemical filter 84 constitutes an intermediate layer of the air filter 80, and air that has passed through the pre-filter 82 passes through the chemical filter 84. The chemical filter 84 is constituted, for example, by an aluminum material, and an aluminum honeycomb in which honeycomb-shaped holes are arranged in a planar direction is applied thereto. For example, in the chemical filter 84, an outer peripheral portion thereof is fixed to a frame 88 in which the main filters 86 are held, and is retained in the upper space 78a.

The main filters 86 are constituted by pleat-folding sheets through which air is capable of passing. The outer peripheries of the main filters 86 are supported by the frame 88. The frame 88 includes an outer peripheral frame 88a that surrounds the entire circumference of the main filters 86, and an intermediate frame 88b that extends from the center in the front-rear direction (the direction of the arrow B) on an inner side of the outer peripheral frame 88a. The pair of main filters 86 are provided on the inner side of the outer peripheral frame 88a so as to sandwich the intermediate frame 88b therebetween. A single main filter 86 may be disposed in the outer peripheral frame 88a, or three or more of the main filters 86 may be disposed in the outer peripheral frame 88a. Each of the main filters 86 extends in the direction of the arrow A while being folded back on itself up and down.

A packing 90 (elastic member) is joined to an outer peripheral surface of the outer peripheral frame 88a in a surrounding manner to the outer peripheral frame 88a. The packing 90 is constituted by an elastic material so as to have an appropriate elastic force, and significantly protrudes from the outer peripheral frame 88a. An outer peripheral side of the packing 90 is adhered in an airtight manner to the inner surface (the side walls 79a to 79d) of the casing 72 (the upper case 78).

In addition, in a horizontal state of the fuel cell vehicle 11, the air filter 80 according to the present embodiment is fixed to the upper case 78 in a state of being inclined through the frame 88 with respect to the horizontal direction which is perpendicular to the direction of gravity. More specifically, on the outer side of the fuel cell stack 12, the air filter 80 is inclined with respect to the vehicle widthwise direction (in the direction of the arrow A). Further, as viewed from the front, the air filter 80 is inclined at a predetermined angle with respect to the direction of extension of the pair of side walls 79a and 79b, at a posture in which one side 80a on the side of the arrow A2 is higher, and another side 80b on the side of the arrow A1 is lower than the inclination of the ceiling wall 79e.

The fixing means for fixing the air filter 80 in an inclined posture between the casing 72 and the frame 88 is not particularly limited, and for example, a non-illustrated supporting component may be appropriately applied thereto. The packing 90 provided on the outer periphery of the frame 88 is appropriately deformed into contact with the side walls 79a to 79d, and maintains the airtightness of the outer side of the frame 88, even in a state in which the frame 88 is inclined and fixed to the casing 72.

The above-described three-layer structure 81 of the air filter 80 connects the mutual filters in a stepped shape. More specifically, the chemical filter 84 is disposed on an inner side of the outer peripheral portion of the main filters 86 including the frame 88, and the pre-filter 82 is disposed on an inner side of the outer peripheral portion of the chemical filter 84.

The air cleaner 70 according to the present embodiment is basically configured in the manner described above. Next, operations of the air cleaner 70 will be described below.

As shown in FIG. 1, in the fuel cell system 10, under the control of the control device 20, the anode gas is supplied to the fuel cell stack 12 from the anode supply pipe 48 of the anode system device 14, and the cathode gas is supplied to the fuel cell stack 12 from the cathode supply pipe 40 of the cathode system device 16. Further, the control device 20 operates the cooling device 18 to circulate the refrigerant, and thereby carries out cooling of the fuel cell stack 12.

Consequently, in the interior of the fuel cell stack 12, the anode gas is supplied to the anodes 30 of the respective power generation cells 22, whereas the cathode gas is supplied to the cathodes 32 of the respective power generation cells 22, and the respective power generation cells 22 generate electrical power. In addition, at the time that electrical power is generated, the fuel cell stack 12 discharges the anode off gas to the anode discharge pipe 50 of the anode system device 14, and discharges the cathode off gas to the cathode discharge pipe 42 of the cathode system device 16.

When supplying the cathode gas, based on operation of the air pump 54, the cathode system device 16 draws in air from the intake pipe 41, and guides the air to the air cleaner 70. As shown in FIGS. 2A and 2B, inside the air cleaner 70, the air flows into the internal space 72a (the lower space 76a) from the air introduction port 73 on the lower side of the casing 72. The air, after having flowed to the rear side through the lower space 76a, rises upward and flows to the dust side 78a1 of the upper space 78a, and then passes through the air filter 80 from the dust side 78a1 (see FIG. 3B). When the air passes through the air filter 80, foreign matter such as dust, dirt, water or the like are removed, and the air moves to the clean side 78a2 (see FIG. 3B) of the upper space 78a. The air that has flowed to the clean side 78a2 flows out to the air lead-out port 74 on the upper side of the casing 72, and flows to the air pump 54 from the relay pipe 66a that is connected to the casing 72.

The air that has flowed to the air pump 54 is pressurized under operation of the air pump 54, flows through the cathode supply pipe 40, passes through the intercooler 56 (the air-cooled type intercooler 56a and the water-cooled type intercooler 56b), and is adjusted to an appropriate temperature. In addition, when the air flows from the intercooler 56 to the humidifier 58, the air is humidified by the humidifier 58, and the humidified air is supplied to the fuel cell stack 12.

Figure 4A:
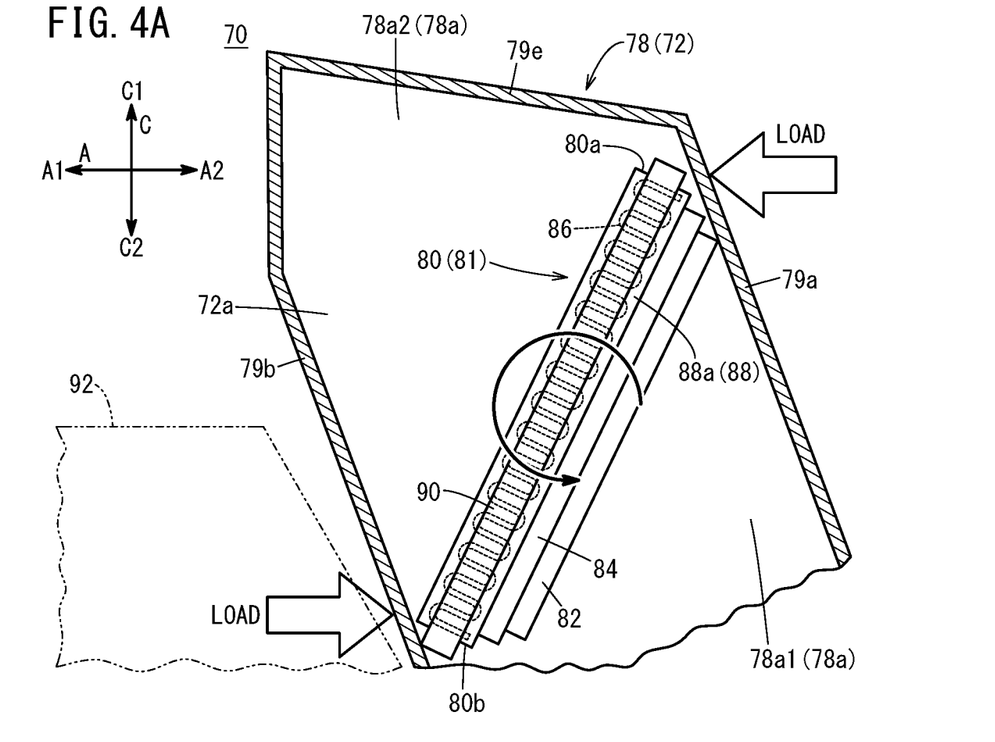
FIG. 4A is a partial side cross-sectional view showing operations when a load is received by the air cleaner according to the present embodiment.

Next, a description will be given concerning actions of the air cleaner 70 when the vehicle 11 receives a load from the side due to a collision or the like. As shown in FIG. 4A, the air cleaner 70 receives the load, which is directed toward the side of the arrow A1, from the side of the vehicle 11 which is on the side of the arrow A2. Further, the peripheral structures 92 are arranged in the surrounding vicinity on the side of the arrow A1 of the air cleaner 70, and when the casing 72 is brought into contact with the peripheral structures 92 upon receiving the load that is directed toward the side of the arrow A1, a load (reaction force) directed toward the side of the arrow A2 is applied to the casing 72. As examples of the peripheral structures 92, there may be cited other devices of the fuel cell system 10 (an oxygen-containing gas supply and discharge device, and a fuel gas supply and discharge device), or alternatively, a motor, a radiator, a headlight, and the like provided in the vehicle 11. In addition, when such loads (in the direction of the arrow A) are applied, the air filter 80, which is inclined with respect to the horizontal direction, rotates inside the internal space 72a without being pushed out with respect to the casing 72 (the inclined posture thereof becomes oriented more toward the direction of gravity).

Figure 4B:
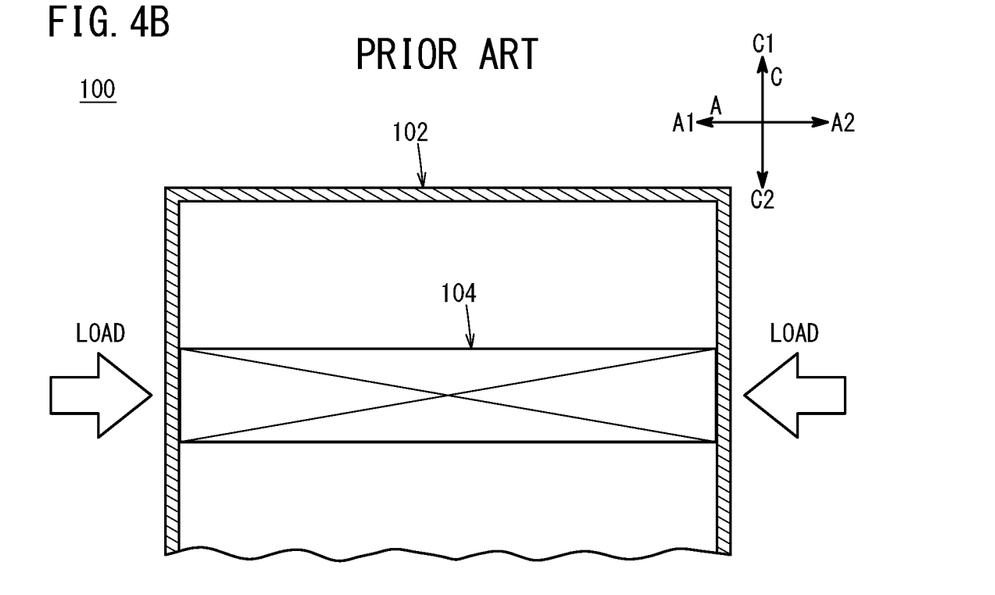
FIG. 4B is a partial cross-sectional view showing operations when a load is received by an air cleaner according to a comparative example.

In this instance, in an air cleaner 100 according to a comparative (conventional) example shown in FIG. 4B, an air filter 104 that is provided inside a casing 102 is arranged so as to extend in a horizontal direction. When the air filter 104 which is arranged in this manner receives a load from the side (in the direction of the arrow A), the load is applied to the entirety of the air filter 104. For this reason, the air filter 104 is less likely to be collapsed by a high buckling load (in other words, the air filter 104 acts so as to be pushed out with respect to the casing 72), and collapsing of the casing 72 is suppressed. As a result, the entirety of the air cleaner 100 moves accompanying the load, and there is a concern that damage may occur to the peripheral structures 92 around the periphery of the air cleaner 70.

In contrast thereto, the air filter 80 of the air cleaner 70 according to the present embodiment is inclined with respect to the horizontal direction, whereby the height on the one side 80a and the height on the other side 80b of the air filter 80 are arranged differently (see FIG. 4A). More specifically, the one side 80a that is positioned on the upper side is on the side of the arrow A2, and the other side 80b that is positioned on the lower side is on the side of the arrow A1. Further, the air filter 80 is attached in a more inclined manner, without being attached in a direction perpendicular with respect to the direction in which the side walls 79a and 79b of the casing 72 extend.

Therefore, when a load is received in the direction of the arrow A, the air filter 80 positively rotates in a counterclockwise direction (the one side 80a moves toward the side of the arrow A1, and the other side 80b moves toward the side of the arrow A2). Accordingly, when the load is received, almost no influence is imparted due to the rigidity of the air filter 80, and the side walls 79a and 79b move so as to approach one another and the casing 72 easily collapses. Stated otherwise, by promoting collapsing of the casing 72, the inclined air filter 80 is capable of suppressing movement of the air cleaner 70 as a whole, and in accordance therewith, it is possible to reduce damage to the peripheral structures 92 caused by the air cleaner 70.

Moreover, the present invention is not limited to the embodiment described above, and various modifications may be made thereto in line with the essence and gist of the present invention. For example, the inclined posture of the air filter 80 may be opposite to that shown in FIG. 3B. More specifically, the air filter 80 may have an inclined posture in which the other side 80b on the side of the arrow A1 is positioned on an upper side, and the one side 80a on the side of the arrow A2 is positioned on a lower side. Further, the shape of the casing 72 may be formed in a manner in which the side walls 79a and 79b shown in FIG. 3B are inclined in an opposite orientation, or alternatively, may be formed with a non-inclined configuration (a rectangular shape, a cubic shape, or the like).

Figure 5A:
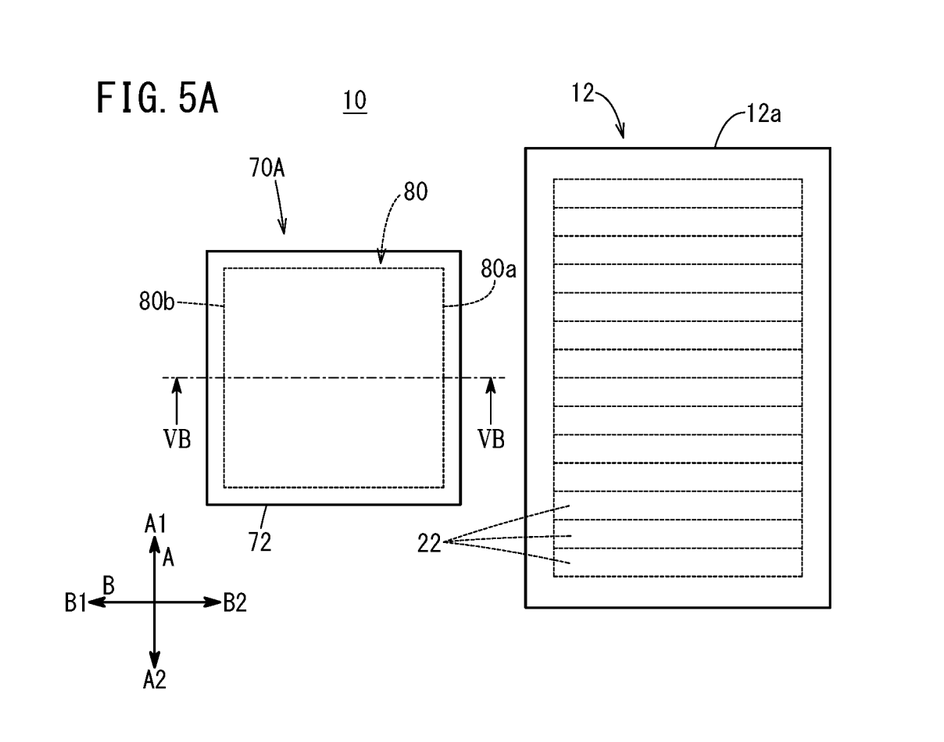
FIG. 5A is a schematic plan view of a fuel cell system to which an air cleaner according to a modification is applied.
Figure 5B:
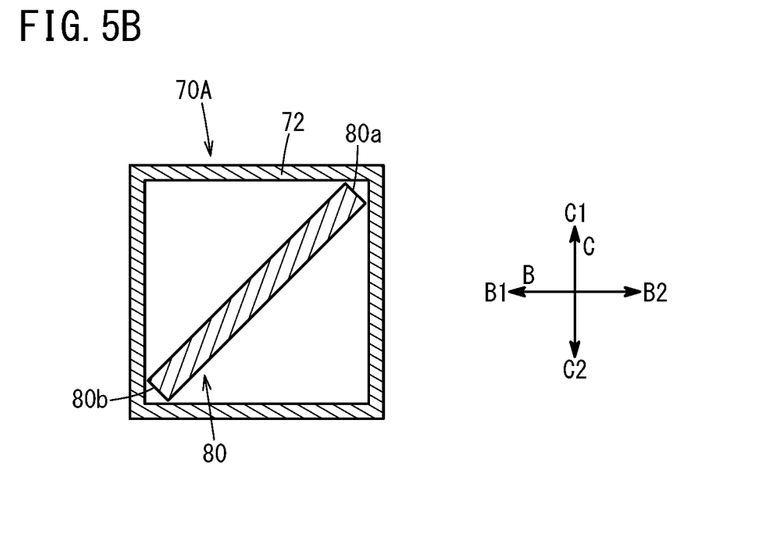
FIG. 5B is a cross-sectional view taken along line VB-VB of FIG. 5A.

Further, for example, as in the modification shown in FIG. 5A, the fuel cell system 10 may have a configuration in which an air cleaner 70A is arranged on a front side (the side of the arrow B1) in a horizontal direction of the fuel cell stack 12. As viewed in cross section from the side (as shown in FIG. 5B), the air filter 80, which is inclined with respect to the horizontal direction, may be provided in the interior of the casing 72 of the air cleaner 70A. More specifically, the air filter 80 is inclined in a manner so that one side 80a thereof on the side of the arrow B2 is positioned on an upper side, and the other side 80b of the air filter 80 on the side of the arrow B1 is positioned on a lower side.

The air cleaner 70A, which is arranged in the foregoing manner, allows the air filter 80 to be positively rotated when a load due to a collision or the like is applied in the front-rear direction (the direction of the arrow B), whereby it is possible to promote collapsing of the casing 72. Accordingly, the air cleaner 70A can suppress damage from occurring to the fuel cell stack 12. Moreover, the inclined posture of the air filter 80 of the air cleaner 70A may be in an opposite direction to that shown in FIG. 5B, and more specifically, may be in an inclined posture in which the one side 80a on the side of the arrow B2 is positioned on a lower side, and the other side 80b on the side of the arrow B1 is positioned on an upper side.

A description will be given below concerning the technical concepts and effects that can be grasped from the above-described embodiment.

One aspect of the present invention is characterized by the air cleaner 70 or 70A provided in the cathode system device 16 of the fuel cell system 10 configured to be mounted in the fuel cell vehicle 11, including the casing 72 having the internal space 72a through which the air flows, and the air filter 80 accommodated in the internal space 72a, wherein the air filter 80 has a flat plate shape, and is arranged on an outer side of the fuel cell stack 12 in a horizontal direction, and in a state of being inclined with respect to the horizontal direction.

The above-described air cleaner 70 or 70A is capable of easily promoting collapsing of the casing 72 when a load is received. More specifically, the air filter 80, which is arranged in a state of being inclined with respect to the horizontal direction, positively rotates without being pushed out inside the casing 72 when such a load is received. Accordingly, the casing 72 is smoothly collapsed by the load, movement of the air cleaner 70 or 70A itself is suppressed, and damage caused to peripheral structures 92 around the periphery of the casing 72 can be significantly reduced.

Further, the casing 72 includes the air introduction port 73 disposed downwardly of the air filter 80, and the air lead-out port 74 disposed upwardly of the air filter 80, and the air flows from the air introduction port 73, through the air filter 80, and to the air lead-out port 74. In accordance with such features, the air cleaner 70 or 70A is capable of removing foreign matter from the air that is taken in, and such foreign matter (water or the like) can drop to the lower side of the casing 72.

Further, the air filter 80 has the three-layer structure 81. Consequently, foreign matter contained in the air that flows toward the fuel cell stack 12 can be more forcefully removed. In addition, in the air cleaner 70 or 70A, even if the air filter 80 is constructed rigidly by the three-layer structure 81, since the air filter 80 is arranged in an inclined manner, it can be positively rotated, whereby it is possible to promote collapsing of the casing 72.

Further, the air filter 80 includes the frame 88 disposed on the outer periphery of the air filter 80, and which is fixed to the casing 72. In accordance with this feature, the air filter 80 can be stably fixed to the casing 72 at an inclined posture. In addition, in the air cleaner 70 or 70A, even if the frame 88 is disposed on the outer periphery of the air filter 80, since the air filter 80 is arranged in an inclined manner, it can be positively rotated, whereby it is possible to promote collapsing of the casing 72.

Further, the air filter 80 includes the elastic member (the packing 90) that is adhered in an airtight manner to the side walls 79a to 79d of the casing 72. In accordance with this feature, the air is prevented from escaping from the outer periphery of the air filter 80. Further, the elastic member can be easily deformed, whereby the air filter 80 can be suitably fixed while remaining at an inclined posture.

Further, the air filter 80 is installed in an inclined manner with respect to the side wall (the side walls 79a to 79d) of the casing 72. In accordance with this feature, the air filter 80 can be further inclined with respect to the horizontal direction, and it is possible to promote collapsing of the casing 72 when a load is received.

Further, the air cleaner 70 is installed on the outer side of the fuel cell stack 12 in the vehicle widthwise direction, and the air filter 80 is inclined with respect to the vehicle widthwise direction. In accordance with such features, the air cleaner 70 allows the air filter 80 to be rotated inside the casing 72 when a load is applied thereto from a side of the vehicle 11, whereby it is possible to promote collapsing of the casing 72.

Further, the air cleaner 70 is installed on the front side of the fuel cell stack 12, and the air filter 80 is inclined with respect to a front-rear direction. In accordance with such features, the air cleaner 70 allows the air filter 80 to be rotated inside the casing 72 when a load is applied thereto from the front of the vehicle 11, whereby it is possible to promote collapsing of the casing 72.

What is claimed is:

1. An air cleaner provided in a cathode system device of a fuel cell system configured to be mounted in a fuel cell vehicle, the air cleaner comprising:
   a casing having an internal space through which air flows; and
   an air filter accommodated in the internal space;
   wherein the air filter has a flat plate shape, and is arranged on an outer side of a fuel cell stack in a horizontal direction, and in a state of being inclined with respect to the horizontal direction.

2. The air cleaner according to claim 1, wherein:
   the casing comprises an air introduction port disposed downwardly of the air filter, and an air lead-out port disposed upwardly of the air filter; and
   the air flows from the air introduction port, through the air filter, and to the air lead-out port.

3. The air cleaner according to claim 1, wherein the air filter has a three-layer structure.

4. The air cleaner according to claim 1, wherein the air filter includes a frame disposed on an outer periphery of the air filter, and which is fixed to the casing.

5. The air cleaner according to claim 4, wherein the air filter includes an elastic member that is adhered in an airtight manner to side walls of the casing.

6. The air cleaner according to claim 1, wherein the air filter is installed in an inclined manner with respect to a side wall of the casing.

7. The air cleaner according to claim 1, wherein:
   the air cleaner is installed on an outer side of the fuel cell stack in a vehicle widthwise direction; and
   the air filter is inclined with respect to the vehicle widthwise direction.

8. The air cleaner according to claim 1, wherein:
   the air cleaner is installed on a front side of the fuel cell stack; and
   the air filter is inclined with respect to a front-rear direction.

* * * * *